(12) United States Patent
Shinohara

(10) Patent No.: US 8,740,418 B2
(45) Date of Patent: Jun. 3, 2014

(54) OPTICAL ELEMENT AND LIGHT EMITTING DEVICE

(75) Inventor: Yoshinori Shinohara, Nagano (JP)

(73) Assignees: Nittoh Kogaku K.K. (JP); Yashuhiro Koike (JP)

( * ) Notice: Subject to any disclaimer, the term of this patent is extended or adjusted under 35 U.S.C. 154(b) by 365 days.

(21) Appl. No.: 13/124,042

(22) PCT Filed: Sep. 16, 2009

(86) PCT No.: PCT/JP2009/004650
§ 371 (c)(1),
(2), (4) Date: Apr. 13, 2011

(87) PCT Pub. No.: WO2010/044190
PCT Pub. Date: Apr. 22, 2010

(65) Prior Publication Data
US 2011/0199774 A1     Aug. 18, 2011

(30) Foreign Application Priority Data

Oct. 17, 2008   (JP) ................................. 2008-269188

(51) Int. Cl.
*F21V 3/00* (2006.01)
*F21V 5/00* (2006.01)

(52) U.S. Cl.
USPC .................................. 362/311.06; 362/311.01

(58) Field of Classification Search
USPC ............. 362/311.02, 311.04, 311.05, 311.06, 362/311.07, 311.08, 311.09, 311, 311.1
See application file for complete search history.

(56) References Cited

U.S. PATENT DOCUMENTS

2007/0098998 A1*   5/2007   Chang et al. ............... 428/423.1

2008/0310171 A1   12/2008   Hiraishi et al.

FOREIGN PATENT DOCUMENTS

| JP | 2004-87630 A | 3/2004 |
| JP | 2007-206569 A | 8/2007 |
| JP | 2007-329114 A | 12/2007 |

OTHER PUBLICATIONS

Machine translation of JP2007-329114.*
Machine translation of publication JP2007-329114 published on Dec. 20, 2007, translated on Mar. 29, 2013.*
International Search Report for International Application No. PCT/JP2009/004650 with English translation mailed Dec. 8, 2009.

* cited by examiner

*Primary Examiner* — Anh Mai
*Assistant Examiner* — Zachary J Snyder
(74) *Attorney, Agent, or Firm* — Cantor Colburn LLP

(57) ABSTRACT

Provided is an optical element which suppresses generation of glare and a dark section and is applicable to planar light emission having improved light efficiency. A light emitting device is also provided. A light emitting device is provided with: a light transmitting member having a light inputting section having light inputted thereto, a first light guide section which guides light inputted to the inputting section to a reflecting surface, the reflecting surface which is arranged on the first light guide section on the side opposite to the light inputting side and totally reflects light which forms one linear path among inputted light, and a second light guide section which guides reflected light; and a light emitting member which inputs light to the inputting section. The first light guide section contains light scattering particles, which multiply scatter light and generate light that passes through the reflecting surface and is outputted to the external, and the second light guide section partially or entirely outputs inputted light to the same surface to which light passed through the reflecting surface is outputted.

7 Claims, 12 Drawing Sheets

OPTICAL ELEMENT AND LIGHT EMITTING DEVICE

This is a U.S. national stage application of International Application No. PCT/JP2009/004650, filed on 16 Sep. 2009. Priority under 35 U.S.C. §119(a) and 35 U.S.C. §365(b) is claimed from Japanese Application No. JP2008-269188, filed 17 Oct. 2008, the disclosure of which is also incorporated herein by reference.

BACKGROUND OF THE INVENTION

1. Field of the Invention

The present invention relates to an optical element and a light emitting device.

2. Description of Related Art

In these years, LED lighting devices are coming into practical use in accordance with the development of high power LEDs (Light Emitting Diodes) and high efficiency LEDs as alternatives to incandescent light-bulbs and fluorescent lamps. Being compared with an incandescent light-bulb and a fluorescent lamp, an LED is small in its size and high in the luminous density. Furthermore, while the incandescent light-bulb and fluorescent lamp emit light all the directions, the LED is provided with a feature of having a narrow directivity. Moreover, recently power LEDs with their capacity of 3 W and 10 W have been also coming into practical use.

As a light emitting device using such an LED for a light source, a light emitting device described next is proposed. In the light emitting device, light emitted from an LED goes through a translucent member, and is reflected by a reflecting mirror and the like. The reflected light is reflected by a reflecting mirror so as to be launched from a second surface located at a place opposite to a first surface of a disk-shaped member (Refer to Patent Document 1).

PRIOR ART DOCUMENT

Patent Document

Patent Document 1: JP 2004-87630 A

SUMMARY OF THE INVENTION

Unfortunately, in the case of such a light emitting device described in Patent Document 1, light emitted from an LED is introduced into a tight area located at a side part of the LED so as to be launched from the side part, and then the light is launched to one side of a disk-shaped member. Therefore, when a flat surface side of the disk-shaped member is used as a light source, a central section of the flat surface may sometimes become excessively bright, or contrarily too dark. In other words, if light linearly emitted toward an upper part of the LED passes through there, the central section of the flat surface has a high luminous density so as to result in a high brightness (glare) there. Meanwhile, if light at the central section is interrupted by a reflecting mirror, there appears a dark circle at the central section of the flat surface. Thus, the light emitting device described in Patent Document 1 is hardly appropriate as a surface light source.

Moreover, in the case of the light emitting device described in Patent Document 1; light launched from the side part of the LED is refracted at the side part, if the side part does not intersect at a right angle with the launched light; so that it becomes hardly possible to radiate the light to the reflecting mirror at a predetermined angle. Furthermore, if the side part of the LED is rough with unevenness, a launching direction of the light from the LED diffuses in a relatively wide angular range and then it becomes hardly possible to control the launched light in a certain direction. Thus, if there exists any light that do not progress to the reflecting mirror with a designed angle, a part of launched light may not be radiated to the reflecting mirror, or a part of the launched light may be reflected in directions other than a predetermined direction. As a result, the light emitting device has a high percentage of light of radiation loss.

Thus, it is an object of the present invention to provide an optical element and a light emitting device that suppress the appearance of glare parts and dark sections, furthermore having a high optical efficiency so as to be suitable for surface luminescence.

To achieve the object described above, an optical element according to the present invention includes: a light incoming section through which light enters; a first light guiding section for guiding the light incident on the light incoming section; a reflecting surface, placed to be opposite to a light entry side of the first light guiding section, for totally-reflecting a linearly-traveling part of the incident light; and a second light guiding section for guiding the reflected light; wherein the first light guiding section contains light scattering particles for multiply-scattering light and generating light which passes through the reflecting surface and is emitted externally; and the second light guiding section launches at least a part of the incident light in a direction of the same surface side as the light passing through the reflecting surface travel out.

It is preferable that the second light guiding section includes a prism section at a position, opposite to a side of the reflecting surface; the prism section having its sawtooth-like section for changing traveling directions of the guided light in the direction of the same side as the reflecting surface.

It is preferable that a reflecting part is formed at an edge positioned within the second light guiding section, being distant from the first light guiding section; the reflecting part reflecting the guided light toward the same side as the reflecting surface.

It is preferable that; with regard to the light scattering particles, where a scattering parameter and a thickness of the first light guiding section are expressed as "τ" and "T", respectively, the product of "τ" and "T" with respect to the light scattering particles is within a range of 0.1 to 50.

To achieve the object described above, a light emitting device according to the present invention includes: a translucent member, and a light emitting component; the translucent member including: a light incoming section through which light enters, a first light guiding section for guiding the light incident on the light incoming section, a reflecting surface, placed to be opposite to a light entry side of the first light guiding section, for totally-reflecting a linearly-traveling part of the incident light, and a second light guiding section for guiding the reflected light; and the light emitting component emitting light into the light incoming section; wherein the first light guiding section contains light scattering particles for multiply-scattering light and generating light which passes through the reflecting surface and is emitted externally; and the second light guiding section launches at least a part of the incident light in a direction of the same surface side as the light passing through the reflecting surface travel out.

It is preferable that the second light guiding section is formed to be plate-like; and the first light guiding section is placed at a center of the plate-like second light guiding section.

It is preferable that the translucent member is made of a translucent resin material, and the light scattering particles are silicon particles having their particle diameter within a range from 1 to 10 μm; and the light scattering particles are also included in the second light guiding section.

According to the present invention, provided can be an optical element and a light emitting device that suppress the appearance of a glare zone and a dark section, furthermore having a high optical efficiency so as to be suitable for surface luminescence.

DETAILED DESCRIPTION OF THE PREFERRED EMBODIMENTS

Structures and functions of an optical element and a light emitting device according to an embodiment of the present invention are described below with reference to the accompanied drawings.

(Structure of Optical Element)

Figure 1:
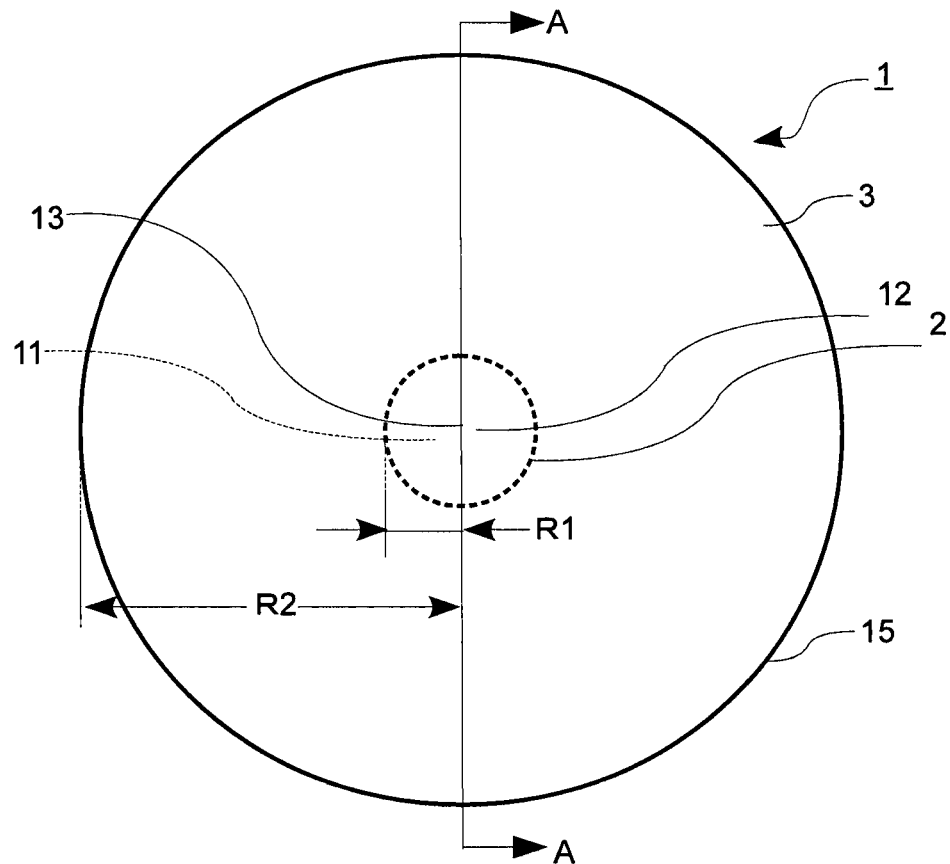
FIG. 1 is a plan view drawing to show a structure of a translucent member as an optical element according to an embodiment of the present invention.
Figure 2:
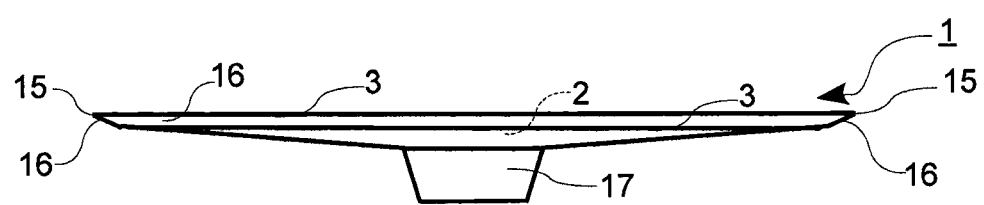
FIG. 2 is a front elevation view of the translucent member shown in FIG. 1.
Figure 3:
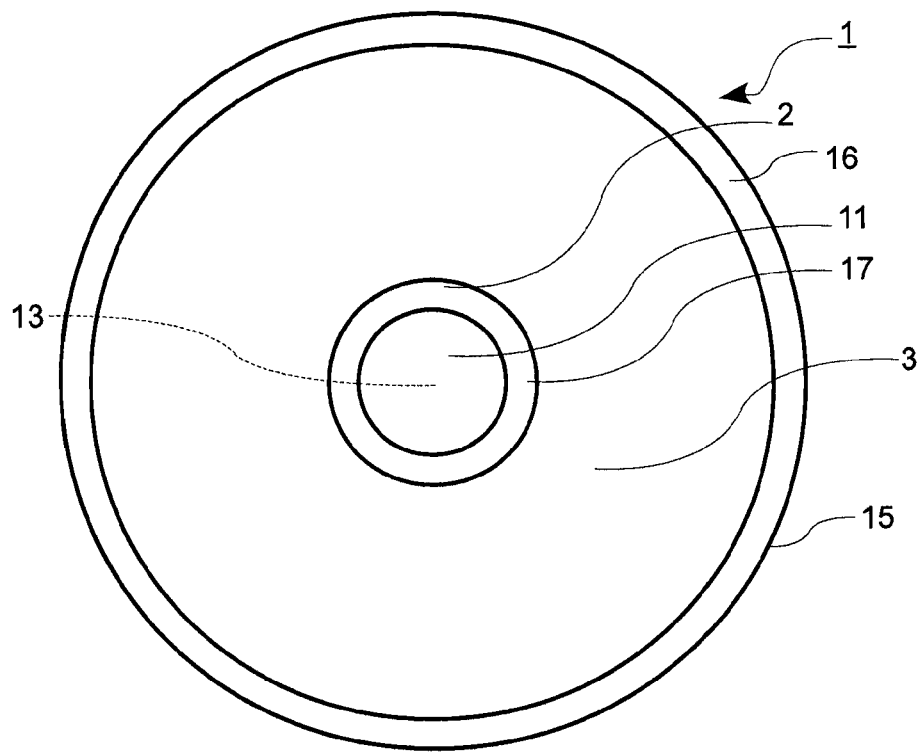
FIG. 3 is a bottom plan view of the translucent member shown in FIG. 1.

FIG. 1 is a plan view drawing to shows a structure of a translucent member 1 as an optical element according to an embodiment of the present invention, and in the meantime, FIG. 2 and FIG. 3 are a front elevation view and a bottom plan view of the translucent member, respectively.

As shown in FIGS. 1 to 3, having its circular contour, the translucent member 1 is a transparent poly-methyl methacrylate (hereinafter abbreviated to "PMMA") resin compact that contains spherical and translucent silicone particles (not illustrated) with their particle diameter of several micro-meters, as light scattering particles. The translucent member 1 includes a first light guiding section 2 positioned at a central area, and being flat and circular-shaped; and a second light guiding section 3 positioned around the first light guiding section 2, and being torus or doughnut-shaped. The first light guiding section 2 includes a light incoming section 11 through which light enters the first light guiding section 2 (Refer to FIG. 3 and FIG. 4), and a reflecting surface 12 that reflects the incident light on the light incoming section 11, and is located at a surface opposite to the light incoming section 11.

Positioned at a center of the reflecting surface 12 is a center point 13, which is a center of the translucent member 1, and a center of the first light guiding section 2, as well as a center of the second light guiding section 3. In the translucent member 1, the incident light on the light incoming section 11 is guided to the reflecting surface 12, and then the light, reflected by the reflecting surface 12 is guided to the second light guiding section 3. The first light guiding section 2 and the second light guiding section 3 are integrated into a whole in such a manner that the translucent member 1 is so made as to look like just a wholly-integrated single component. In the following explanation, an upper side and a lower side in FIG. 2 are called a topside and a bottom side of the translucent member 1, respectively.

The first light guiding section 2 shown in FIG. 1 has its outer radius (R1) of 11 mm, meanwhile the second light guiding section 3 has its outer radius (R2) of 80 mm. Therefore, in the translucent member 1, an area that the first light guiding section 2 occupies is calculated from a formula $(\pi R1^2/\pi R2^2)$ to be approximately 1.89%.

As shown in FIG. 2, a topside surface of the second light guiding section 3 of the translucent member 1 is a flat surface, meanwhile a bottom side surface of the second light guiding section 3 is so formed as to slope from an edge 15 of the translucent member 1 toward the first light guiding section 2 positioned at the center of the translucent member 1 to gradually increase the thickness of the second light guiding section 3. Then, at a lower side of the edge 15 of the translucent member 1, there is formed a ring-shaped reflecting part 16 that fully reflects upward the light guided into the second light guiding section 3. The reflecting part 16 is placed in a concentric pattern having its center at the center point 13. In the meantime, the first light guiding section 2 has an LED holder 17, shaped to be cylindrical, at its bottom side.

As shown in FIG. 3, the circular first light guiding section 2 is located at a central area of the translucent member 1; and the LED holder 17, being ring-shaped, is located at a bottom side of the first light guiding section 2. In the meantime, the reflecting part 16, being ring-shaped, is formed with a uniform shape at each location along an entire circumference at a bottom side of the edge 15 of the second light guiding section 3.

Figure 4:
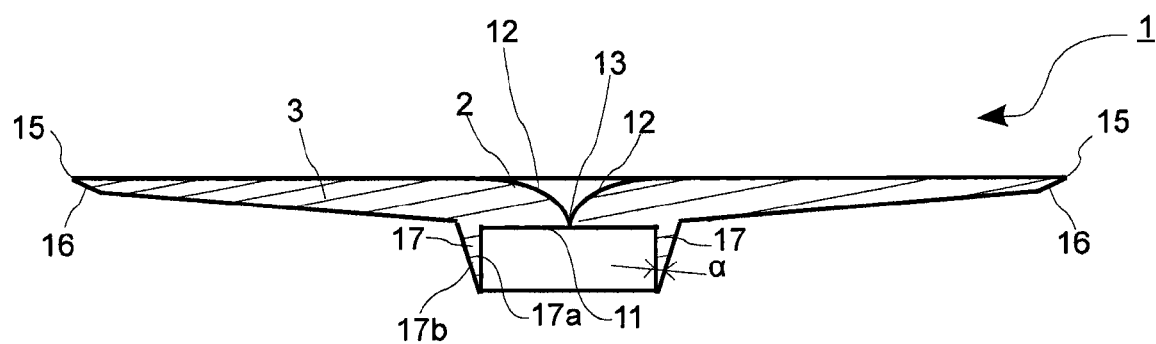
FIG. 4 is a cross-sectional view taken from the line A-A of the plan view of FIG. 1.

FIG. 4 is a cross-sectional view taken from the line A-A of the plan view of FIG. 1. The LED holder 17 is shaped to be cylindrical, being protruded toward a bottom side. Though constituting a part of the first light guiding section 2, the LED holder 17 may be placed at a bottom side of the second light guiding section 3, being formed as a part of the second light guiding section 3. An inner-circumferential surface 17a of the LED holder 17 stretches to a bottom side, being perpendicular to a flat surface of the light incoming section 11. In the meantime, an outer-circumferential surface 17b of the LED holder 17 is so formed as to make an acute angle "a" with respect to the inner-circumferential surface 17a. When light coming from a light source to be described later enters the LED holder 17, the outer-circumferential surface 17b reflects incident light and guides the light toward the first light guiding section 2 and the second light guiding section 3.

Figure 5:
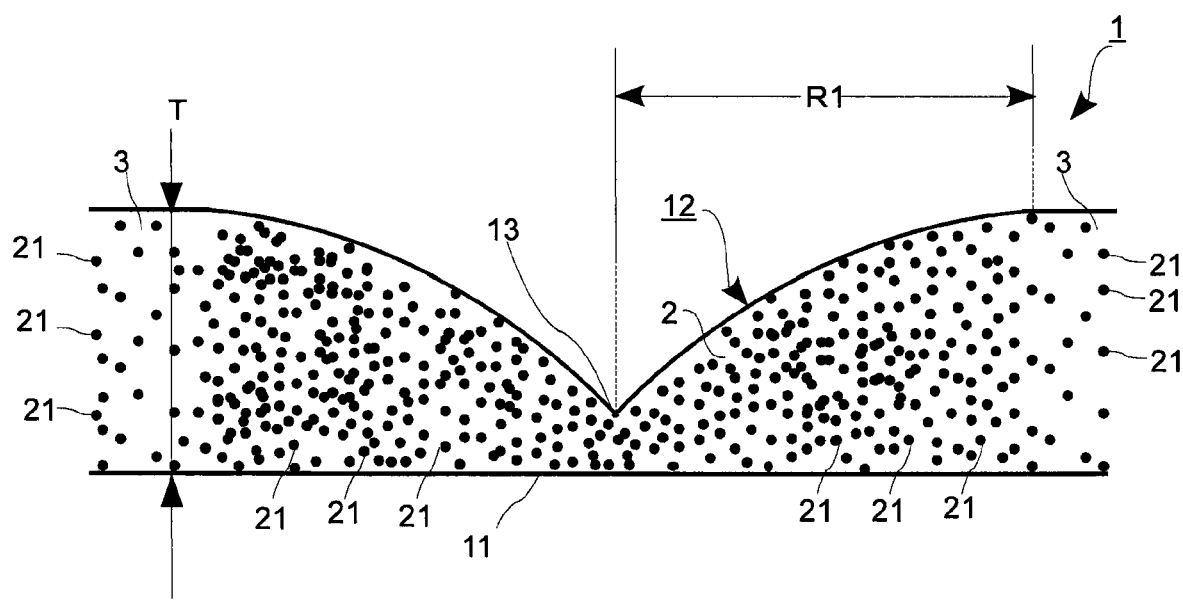
FIG. 5 is an enlarged view showing details of a part of a reflecting surface of the translucent member shown in the cross-sectional view of FIG. 4.

FIG. 5 is an enlarged view showing details of a surrounding part of the reflecting surface 12 of the translucent member 1 shown in the cross-sectional view of FIG. 4. A most concave part in the reflecting surface 12 has the center point 13. Incidentally, the translucent member 1 shown in FIG. 5 contains light scattering particles 21. The light scattering particles 21 are silicone particles with their particle diameter of 1 to 10 μm, and are contained with a higher density in the first light guiding section 2 than in the second light guiding section 3. More specifically, a content rate of the light scattering particles 21 in the first light guiding section 2 is 0.1 weight percent, meanwhile that in the second light guiding section 3 is 0.06 weight percent. Incidentally, where a scattering parameter and a thickness of the first light guiding section 2 are expressed as "τ" and "T", respectively, the product of "τ" and "T" with respect to the light scattering particles 21 contained in the first light guiding section 2 is within a range of 0.1 to 50.

In the present embodiment, the LED holder 17 also contains the light scattering particles 21, and a content rate of the light scattering particles 21 there is the same as that in the first light guiding section 2. However, it is also possible for the LED holder 17 to contain no light scattering particles 21 or to have the same content rate of the light scattering particles 21 as that in the second light guiding section 3. FIG. 5 shows that the light scattering particles 21 are placed in a dispersed state.

The light scattering particles 21 are further described next. The light scattering particles 21 are light guiding elements provided with a uniform scattering power within their volume-wise extent, and they include a number of spherical particles as scattering fine particles. When light enters an internal area of the first light guiding section 2 or the second light guiding section 3, the light is scattered by the scattering fine particles.

The Mie scattering theory that provides the theoretical fundamentals of the light scattering particles 21 is explained next. Calculated in the Mie scattering theory is a solution for Maxwell's equations of electromagnetism in the case where spherical particles (scattering fine particles) exist in a ground substance (matrix) having a uniform refractive index, wherein the spherical particles having a refractive index that is different from the refractive index of the matrix. A formula (1) described below expresses a light intensity distribution I (A, θ) dependent on scatting angles of light scattered by scattering fine particles that correspond to the light scattering particles 21. "A" is a size parameter representing an optical size of the scattering fine particles, and the parameter shows an amount corresponding to a radius "r" of the spherical particles (the scattering fine particles) standardized with a wavelength "λ" of light in the matrix. Meanwhile, an angle "Θ" represents a scattering angle, wherein a direction identical to a traveling direction of incident light corresponds to "Θ=180 deg."

"i1" and "i2" in the formula (1) are expressed with formulas (4). Then, "a" and "b" subscripted with "v" in formulas (2) to (4) are expressed with formulas (5). P(cos Θ) superscripted with "1" and subscripted with "v" is a Legendre polynomial; meanwhile "a" and "b" subscripted with "v," are composed of a first kind Recatti-Bessel function $\Psi_v$, a second kind Recatti-Bessel function and their derivatives. "m" is a relative refractive index of the scattering fine particles with reference to the matrix, namely "m=n-scatter/n-matrix."

[Expression 1]

$$I(A, \Theta) = \frac{\lambda^2}{8\pi^2}(i_1 + i_2) \tag{1}$$

$$K(A) = \left(\frac{2}{\alpha^2}\right)\sum_{v=1}^{\infty}(2v+1)(|a_v|^2 + |b_v|^2) \tag{2}$$

$$A = 2\pi r/\lambda \tag{3}$$

$$i_1 = \left|\sum_{v=1}^{\infty}\frac{2v+1}{v(v+1)}\left\{a_v\frac{P_v^1(\cos\Theta)}{\sin\Theta} + b_v\frac{dP_v^1(\cos\Theta)}{d\Theta}\right\}\right| \tag{4}$$

$$i_2 = \left|\sum_{v=1}^{\infty}\frac{2v+1}{v(v+1)}\left\{b_v\frac{P_v^1(\cos\Theta)}{\sin\Theta} + a_v\frac{dP_v^1(\cos\Theta)}{d\Theta}\right\}\right|$$

$$a_v = \frac{\Psi_v'(mA)\Psi_v(A) - m\Psi_v(mA)\Psi_v'(A)}{\Psi_v'(mA)\zeta_v(A) - m\Psi_v(mA)\zeta_v'(A)} \tag{5}$$

$$b_v = \frac{m\Psi_v'(mA)\Psi_v(A) - \Psi_v(mA)\Psi_v'(A)}{m\Psi_v'(mA)\zeta_v(A) - \Psi_v(mA)\zeta_v'(A)}$$

Figure 6:
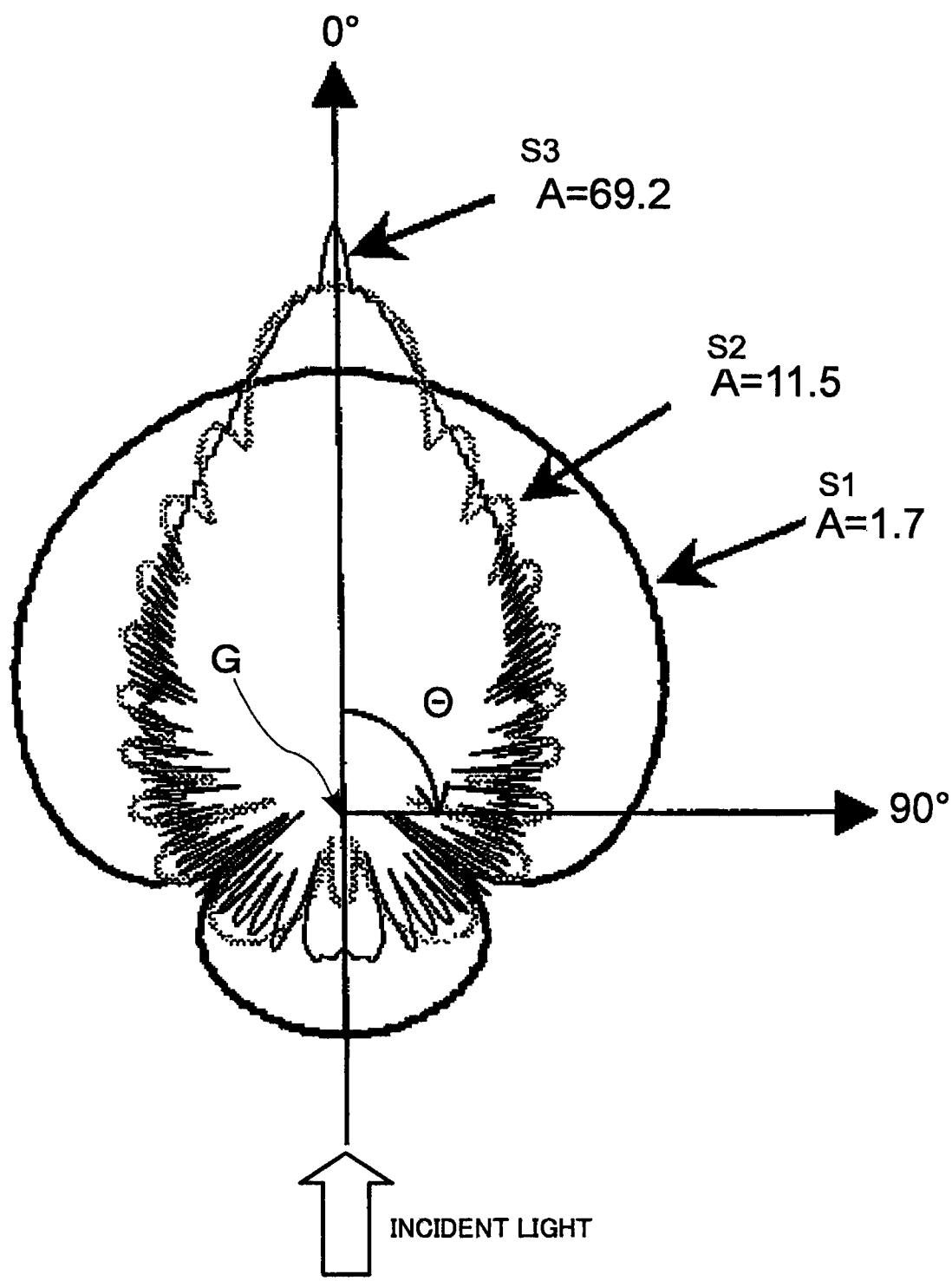
FIG. 6 is a graph showing an angle distribution (A, Θ) of a scattered light intensity by a single spherical particle.

FIG. 6 is a graph showing a light intensity distribution I (A, Θ) by a single spherical particle on the basis of the above formulas (1) to (5). Namely, FIG. 6 shows an angular distribution of scattered light intensity I (A, Θ) in the case of incident light coming in from a lower side, wherein a spherical particle as a scattering fine particle exists at a position of an origin "G." In the figure, a distance from the origin "G" to each of curves S1 to S3 represents the scattered light intensity in a corresponding angular direction of the scattered light. Each curve of S1, S2, and S3 shows the scattered light intensity when the size parameter "A" is 1.7, 11.5, and 69.2, respectively. In FIG. 6, the scattered light intensity is expressed in a logarithmic scale. Therefore, even a slight difference of intensity that appears in FIG. 6 is a significantly large difference in fact.

As shown FIG. 6, it is understood that; the greater the size parameter "A" is (the larger the particle diameter is, at a certain wavelength "λ"), the more intensively the light is scattered in an upward direction (a frontward direction in the direction of radiation) with high directivity. In reality, the angular distribution of scattered light intensity I (A, Θ) can be controlled by using the radius "r" of the scattering element and the relative refractive index "m" between the matrix and the scattering fine particles as parameters, while the wavelength "λ" of incident light is set to be constant.

Thus, when incident light enters a scatter light guiding element that contains N (in number) single spherical particles, the incident light is scattered by a spherical particle. Moving forward through the scatter light guiding element, the scattered light is then scattered again by another spherical particle. In the case where particles are added with a certain volume concentration or higher, such scattering operation sequentially repeats several times and then the light is launched out of the scatter light guiding element. A phenomenon, in which such a scattered light is further scattered, is called a multiple scatter phenomenon. Though it is not easy to analyze such a phenomenon of multiple scattering in a translucent polymer substance by means of a ray tracing method, the behavior of a ray can be traced by Monte Carlo method for analysis of its characteristics. According to the analysis, in the case of incident light having no polarization, a cumulative distribution function of scattering angle "F(Θ)" is expressed with a formula (6) described next.

[Expression 2]

$$F(\Theta) = \frac{\int_0^\Theta I(\Theta)\sin\Theta \, d\Theta}{\int_0^\pi I(\Theta)\sin\Theta \, d\Theta} \qquad (6)$$

"I(Θ)" in the formula (6) means the scattered light intensity of the spherical particle of the size parameter "A" expressed in the formula (1). When light having an intensity "$I_0$" enters the scatter light guiding element, and transmits for a distance "y" so as to be attenuated into "I" through the scattering, a formula (7) described below represents a relationship of the phenomenon.

[Expression 3]

$$\frac{I}{I_0} = \exp(-\tau y) \qquad (7)$$

"τ" in the formula (7) is called the turbidity (having the same meaning as the "scattering parameter" mentioned previously); and it corresponds to a scattering coefficient of the matrix, and being proportional to the number of particles "N", as a formula (8) indicates below. In the formula (8), "$\sigma^s$" represents a scattering cross-section area.

[Expression 4]

$$\tau = \sigma^s N \qquad (8)$$

According to the formula (7), the probability "$p_t(L)$" of transmission passing through the scatter light guiding element having its length "L" without any scattering is expressed by a formula (9) described below.

[Expression 5]

$$p_t(L) = \frac{I}{I_0} = \exp(-\sigma^s NL) \qquad (9)$$

On the contrary, the probability "$p_s(L)$" of having any scattering within the optical path length "L" is expressed by a formula (10) described below.

[Expression 6]

$$p_s(L) = 1 - p_t(L) = 1 - \exp(-\sigma^s NL) \qquad (10)$$

It is understood according to the formulas described above that adjusting the turbidity "τ" makes it possible to control a degree of multiple scattering in the scatter light guiding element.

As the formulas indicate above, by using at least one of the size parameter "A" and the turbidity "τ" with respect to the scattering fine particles as a parameter, it becomes possible to control multiple scattering in the scatter light guiding element, and also to suitably set the launching light intensity and the scattering angle at a launching surface.

Figure 7:
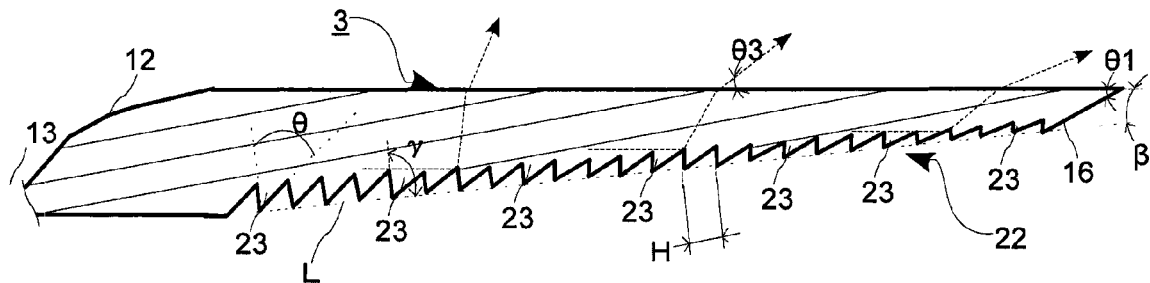
FIG. 7 is an enlarged general view showing a main part of a second light guiding section of the translucent member shown in the cross-sectional view of FIG. 4.

FIG. 7 is an enlarged general view showing mainly a part of the second light guiding section 3 of the translucent member 1 shown in the cross-sectional view of FIG. 4. The second light guiding section 3 has a prism section 22 at its bottom side, the prism section 22 having its sawtooth-like section and being placed on a circle concentric with the center point 13. In the present embodiment, a total of 225 saw teeth 23 are formed in the prism section 22. Incidentally, only 25 in total of the saw teeth 23 are shown in FIG. 7 for the purpose of simple indication. The prism section 22 changes a course of light guided to a bottom side of the second light guiding section 3 to a topside. Meanwhile, a protrusion angle θ of a saw tooth 23 located at a position closer to the center point 13 is acuter than a protrusion angle θ of another saw tooth 23 located at a position further from the center point 13.

Protrusion angles θ0 of the saw teeth 23 are specifically explained below. A protrusion angles θ of 25 saw teeth 23 existing within a width of 5 mm being closest to the center point 13 is 50 degrees. A protrusion angles θ of 25 saw teeth 23 existing within a width of 5 mm being next closer to the center point 13 is 55 degrees. A protrusion angles θ of 25 saw teeth 23 existing within a width of 5 mm being next closer to the center point 13 is 60 degrees. A protrusion angles θ of 25 saw teeth 23 existing within a width of 5 mm being next closer to the center point 13 is 65 degrees. A protrusion angles θ of 50 saw teeth 23 existing within a width of 10 mm being next closer to the center point 13 is 70 degrees. A protrusion angles θ of 75 saw teeth 23 existing within a width of 15 mm being furthest from the center point 13 is 75 degrees. Thus, the prism section 22 includes 6 divided groups of saw teeth 23. Incidentally, the greater gradually the protrusion angle θ of the saw tooth 23 may be made, the further from the center point 13 the saw tooth 23 is located. In the meantime, a distance "H" between neighboring two saw teeth 23 is 0.2 mm, and the saw teeth 23 are placed to be symmetrical with respect to the center point 13.

In FIG. 7, a crossing angle β formed by a line "L" connecting protrusion peaks of the saw teeth 23 in a radial direction and the topside surface of the second light guiding section 3 is 6.5 degrees. Though an angle γ formed by a surface, at a closer side to the center point 13, of each of the saw teeth 23 and the line "L" is 90 degrees, the angle γ may be set to be greater than 90 degrees. If the angle γ is set to be greater, the translucent member 1 can more easily be removed from a mold after the translucent member 1 is formed with the mold. Incidentally, at the lower side of the edge 15 adjacent to a saw tooth 23 located at the furthest position from the center point 13, there is placed the reflecting part 16. An angle $\theta_1$ formed by a surface of the reflecting part 16 and the topside surface of the second light guiding section 3 is 30 degrees.

(Structure of Light Emitting Device)

Figure 8:
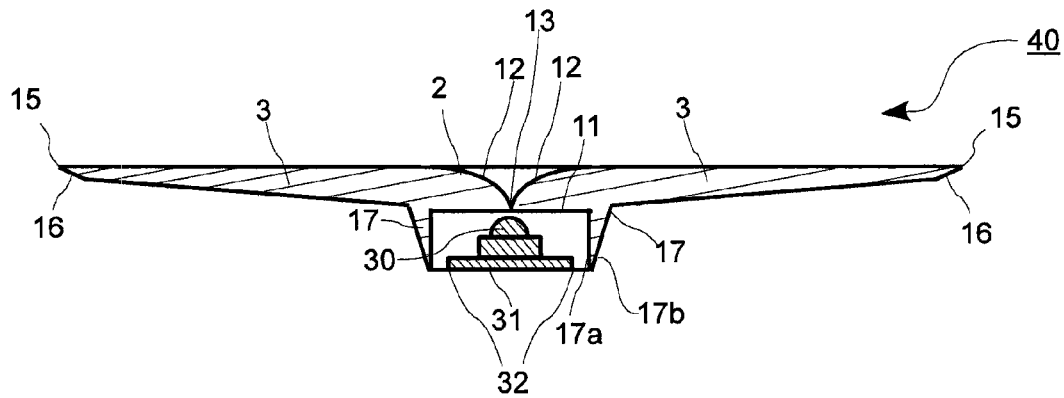
FIG. 8 shows a structure of a light emitting device according to the embodiment of the present invention.

FIG. 8 shows a structure of a light emitting device 40 according to the embodiment of the present invention, the light emitting device 40 having a chip-shaped LED 30 functioning as a light emitting component placed in the translucent member 1 shown in FIG. 4. The LED 30 is placed in a section surrounded by the light incoming section 11 and the LED holder 17 of the translucent member 1. A bottom part 31 of the LED 30 is shaped like a disc so that its circumferential surface 32 faces the inner-circumferential surface 17a of the LED holder 17. The circumferential surface 32 of the bottom part 31 and the inner-circumferential surface 17a of the LED holder 17 are fixed to each other with a fixing member that is not illustrated. By means of fixing that part, the LED 30 is fixed to the LED holder 17. In the meantime, the LED 30 is located at a position facing the center point 13.

(Condition of Light Reflection at Reflecting Surface 12)

Figure 9:
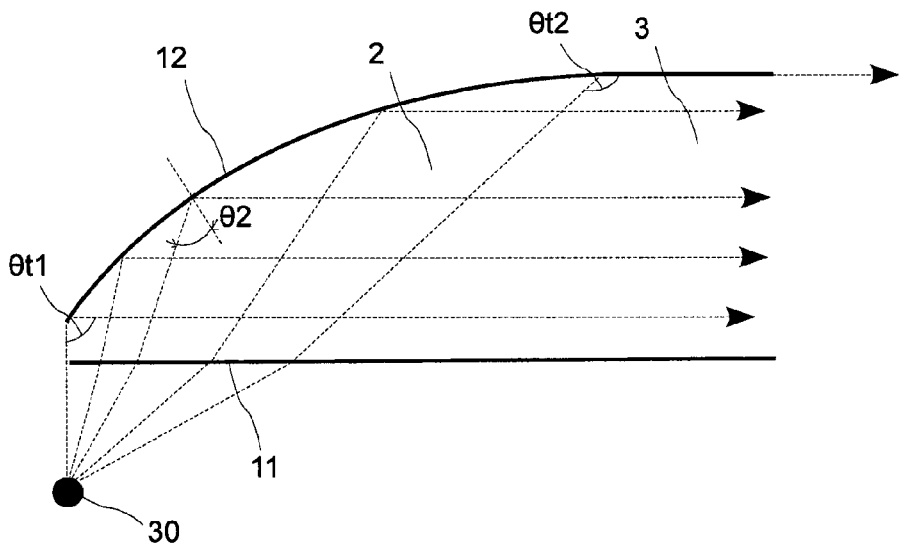
FIG. 9 shows paths through which rays of light emitted from an LED enter the translucent member, and then the rays are reflected at the reflecting surface so as to be guided to the second light guiding section, in the light emitting device according to the embodiment of the present invention.

FIG. 9 shows light paths, with dotted lines, through which rays of light emitted from the LED 30 enter the light incoming section 11 to get into the translucent member 1, and then the light is reflected at the reflecting surface 12 so as to be guided to the second light guiding section 3. When the light emitted from the LED 30 enters the first light guiding section 2 through the light incoming section 11, the light is refracted somewhat in a direction toward the center point 13, and then arrives at the reflecting surface 12. Incidentally, an interface between PMMA as a substance of the translucent member 1 and the atmosphere is formed at the reflecting surface 12. When light is radiated to the reflecting surface 12 with an incident angle $\theta_2$ with respect to the interface (namely, the reflecting surface 12) while the incident angle being greater than a total reflection critical angle (41.84 degrees); the light, traveling from a medium having a higher optical refractive index (PMMA) to another medium having a lower optical refractive index (the atmosphere), does not pass through the interface, but is totally reflected there. On this occasion, the incident angle $\theta_2$ is an angle formed between a normal line at a point, where incident light arrives at the reflecting surface 12, and the incident light. The reflecting surface 12 is so formed as to satisfy the condition for such a total reflection, and furthermore to make the reflected light travel in parallel with the topside surface of the second light guiding section 3. Therefore, most of light emitted from the LED 30 is totally reflected at the reflecting surface 12 so as to become parallel light, and is guided to the second light guiding section 3.

In the meantime, on a profile curve of the reflecting surface 12 shown in FIG. 9, a point corresponding to the center point 13 has a surface where a sum of an incident angle and a reflection angle becomes 90 degrees for light emitted straight upward from the LED 30 as a light source. In other words, an incident angle $\theta_2$ for the point corresponding to the center point 13 is 45 degrees (an angle $\theta_{r1}$ as a sum of the incident angle and reflection angle there is equal to 90 degrees); and a tangential line on the reflecting surface 12 at the reflection point there intersects the topside surface of the second light guiding section 3 with an angle of 45 degrees. On the other hand, at a point where the profile curve of the reflecting surface 12 meets a plane of the topside surface of the second light guiding section 3, an angle $\theta_{r2}$ as a sum of the incident angle and reflection angle there is described as "$\theta_{r2}$=90 degrees+$\theta_c$" (wherein the angle $\theta_c$ is the total reflection critical angle; i.e., 41.84 degrees). A curve F(x) connecting these two points described above is a parabolic curve, as a kind of aspheric curve; and its derivative F'(x) is expressed as "tan (90−$\theta t$/2)."

Incidentally, the translucent member 1 contains the light scattering particles 21. Therefore, in a course from emission out of the LED 30 through entering the first light guiding section 2 to reaching the reflecting surface 12, and another course from reflection at the reflecting surface 12 to being guided into the second light guiding section 3, the light is scattered. Since the light scattering particles 21 multiply-scatter most of the light within the translucent member 1 without attenuation, a part of the incident light passes through the reflecting surface 12 of the first light guiding section 2 to exit upward. In the meantime, the size of the light scattering particles 21 is adjusted according to the Mie scattering theory so as to increase the proportion of scattering in a traveling direction of the incident light, and therefore most of the light travels through almost the same path as they do without the light scattering particles 21. In other words, most of the light that enters the light incoming section 11 travels along the dotted lines with an arrow shown in FIG. 9 from the first light guiding section 2 toward the second light guiding section 3 as almost parallel light.

In the operation described above, the light scattering particles 21 make a part of the light emitted from the LED 30 pass through the reflecting surface 12, and generate light that exits outside. Namely, a past of the light emitted from the LED 30 exits upward from the first light guiding section 2.

(Condition of Light Refraction and Reflection in the Second Light Guiding Section 3)

As described above, the light guided into the second light guiding section 3 changes their traveling directions toward the topside surface of the second light guiding section 3 by the prism section 22 and the reflecting part 16. The line "L" (Refer to FIG. 7) connecting the protrusion peaks of the saw teeth 23 of the prism section 22 is so formed as to make the crossing angle β by intersecting the optical paths of rays of the light guided into the second light guiding section 3. Therefore, the guided parallel light is radiated to the prism section 22.

The light radiated to the prism section 22 changes the traveling direction toward the topside surface of the second light guiding section 3. With regard to the changed traveling direction, an output angle $\theta_3$ at an outer circumferential position becomes smaller, because a protrusion angle θ at the outer circumferential position is greater in the translucent member 1. That is to say; when being applied as a light source, the translucent member 1 works as a light source without directivity for illuminating a wide-angled area (Refer to FIG. 7). Since the light traveling through the second light guiding section 3 is partly scattered by the light scattering particles 21, a part of the light radiated to the prism section 22 may pass through a saw tooth 23 that the light collides with at first, but most of the light that has passed through there at first is radiated to a neighboring saw tooth 23 so as to change its traveling direction toward the topside surface of the second light guiding section 3 by the saw tooth 23. Incidentally, the dotted lines with an arrow shown in FIG. 7 indicate optical paths of rays of the light that change their traveling directions when no light scattering particles 21 exist, or when the light does not collide with the light scattering particles 21.

As described above, the protrusion angle θ of a saw tooth 23 is greater, as the saw tooth 23 is located to be further from a side of the LED 30 toward the edge 15 of the second light guiding section 3 within an area of the second light guiding section 3. Due to the arrangement, as described above, the light that changes its traveling direction is emitted from the topside surface of the second light guiding section 3 with a smaller output angle $\theta_3$, as the emitting position is located to be further from the side of the LED 30.

Furthermore, the light guided to the reflecting part 16 is reflected by the reflecting part 16, and then guided toward the topside surface of the second light guiding section 3, and eventually emitted from the topside. The LED 30 has a strong optical directivity. Then, light traveling in a direction toward the center point 13 is strong, and light traveling in a direction away from the center point 13 is weak. Therefore, in FIG. 7, quantity of light is lager for light guided from a lower area of the reflecting surface 12 (an area close to the center point 13) and an intermediate area of the reflecting surface 12 (an area somewhat away from the center point 13), and in the meantime quantity of light is smaller for light guided from an upper area of the reflecting surface 12 (an area close to the second light guiding section 3) as the area is located to be higher. Thus, the prism section 22 for mainly changing traveling direction of light guided to the lower area and the intermediate area of the reflecting surface 12 changes traveling direction of most of light radiated from the LED 30, and the reflecting part 16 changes traveling direction of residual light. By means of the operation described above, eventually most of the light traveling through the second light guiding section 3 are emitted from the topside.

Incidentally, the second light guiding section 3 also contains the light scattering particles 21. Therefore, in a traveling process of the light entering the second light guiding section 3 from the reflecting surface 12 and traveling further, and also in a traveling process of the light radiated from the prism section 22 toward the topside of the second light guiding section 3, the light is scattered in a complex manner. Then, the light scattering particles 21 multiply-scatter most of the light within the second light guiding section 3 in the same direction as the incident direction. Therefore, most of the light has the same traveling direction so that the light is radiated along the dotted lines shown in FIG. 7. In the meantime, a part of the scattered light follows other path, being different from the dotted lines of FIG. 7, and is emitted from the topside. Specifically, the second light guiding section 3 contains the light scattering particles 21 in a high dense state. Therefore, light from the topside surface of the translucent member 1 is radiated in a fading-bright condition, being different from light coming out of an LED, a naked light bulb, and the like. Furthermore, light emitted from the LED 30, working almost like a point light source, is transformed into those of a surface light source by the first light guiding section 2 and the second light guiding section 3, and therefore the quantity of light radiation per unit area becomes less.

Advantageous Effect Achieved by the Embodiment of the Present Invention

The translucent member 1 and the light emitting device 40 have the first light guiding section 2 equipped with the reflecting surface 12. Therefore, while most of the light that enters the light incoming section 11 travels along the dotted lines with an arrow shown in FIG. 9 from the first light guiding section 2 toward the second light guiding section 3 as almost parallel light, the light is suitably scattered in other directions. Accordingly, the translucent member 1 and the light emitting device 40 that are suitable for surface luminescence can be provided, suppressing the appearance of glare parts and dark sections.

More specifically, it can be said that the translucent member 1 and the light emitting device 40 do not allow most of light, emitted upward linearly from the LED 30, to pass through but totally-reflect it; and furthermore no mirror reflector intercepts light of a central Area. Moreover, some of the strong light emitted from the LED 30 is so scattered as to pass through the reflecting surface 12, and therefore the reflecting surface 12 itself works as a part of a light source. In addition, the second light guiding section 3 emits most of incident light in the same direction as the light passing through the reflecting surface 12. Accordingly, the translucent member 1 and the light emitting device 40 are suitable for surface luminescence, and are also able to suppress any appearance of an excessively glaring part. Furthermore, being able to emit most of the incident light to the topside, the translucent member 1 and the light emitting device 40 are provided with good light efficiency.

A part of light that enters the first light guiding section 2 pass through the reflecting surface 12 to form a surface light source from the first light guiding section 2; and the other part of residual light, as almost parallel light, enter the second light guiding section 3, and afterwards emit from the topside of the second light guiding section 3 so as to form a surface light source from the second light guiding section 3. Therefore, light radiation loss of the light emitting device 40 can be restrained. Meanwhile, even if a part of light, which does not become almost-parallel light and enters the second light guiding section 3, is radiated to the topside of the second light guiding section 3, this light is totally reflected there and not scattered. Therefore, light radiation loss of the light emitting device 40 can further be restrained. Moreover, the light totally-reflected at the topside of the second light guiding section 3 is afterwards reflected at the prism section 22 in a direction according to design intent of the light emitting device 40 so that light radiation loss of the light emitting device 40 can still further be restrained.

Meanwhile, since a content rate of the light scattering particles 21 in the first light guiding section 2 is higher than in the second light guiding section 3, the light that enters the first light guiding section 2 is likely to pass through the reflecting surface 12, and accordingly a light radiation distribution of an entire part of the translucent member 1 can be almost homogenized. Since a degree of multiple scattering can be controlled by adjusting the scattering parameter "τ", an adjustment can be made suitably so as to conform the brightness of the light passing through the reflecting surface 12 to the brightness of the light emitted from the topside of the second light guiding section 3. FIGS. 10 to 13 show brightness distributions in the light emitting device 40 under conditions where the content rate of the light scattering particles 21 in the second light guiding section 3 is kept constant (0.06 wt. %), and meanwhile the content rate of the light scattering particles 21 in the first light guiding section 2 is changed. As a method for making the content rates of the light scattering particles 21 in the first light guiding section 2 and the second light guiding section 3 different from each other, the first light guiding section 2 and the second light guiding section 3 are formed in advance, while each having a different content rate of the light scattering particles 21, and then afterwards the two light guiding sections are assembled together through integrating into a whole.

Figure 10:
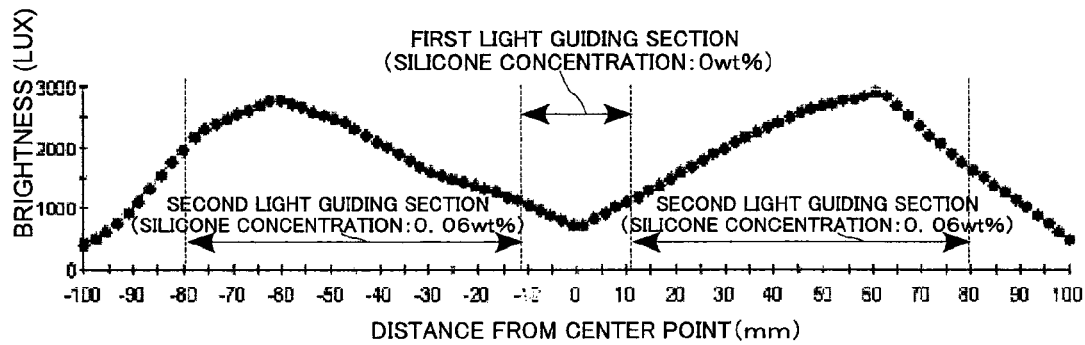
FIG. 10 shows a brightness distribution in a light emitting device of a first modification with respect to the light emitting device according to the embodiment of the present invention.

FIG. 10 shows a brightness distribution in the light emitting device 40 (the light emitting device 40 of a first modification) in which the first light guiding section 2 contains none of the light scattering particles 21 (Content rate=0 wt. %). According to FIG. 10, it is understood that the second light guiding section 3 is brighter than the first light guiding section 2. A reason why some brightness can also be observed in the first light guiding section 2 is that the LED 30 as the light source is not a point light source, and therefore the light is not necessarily totally-reflected and some of the light is allowed to pass through the reflecting surface 12. Incidentally, each horizontal axis in FIGS. 10 to 13 represents distances from the center point 13, where a position of the center point 13 is related to "0." Diameters of the first light guiding section 2 and the second light guiding section 3 are 22 mm and 160 mm, respectively.

Figure 11:
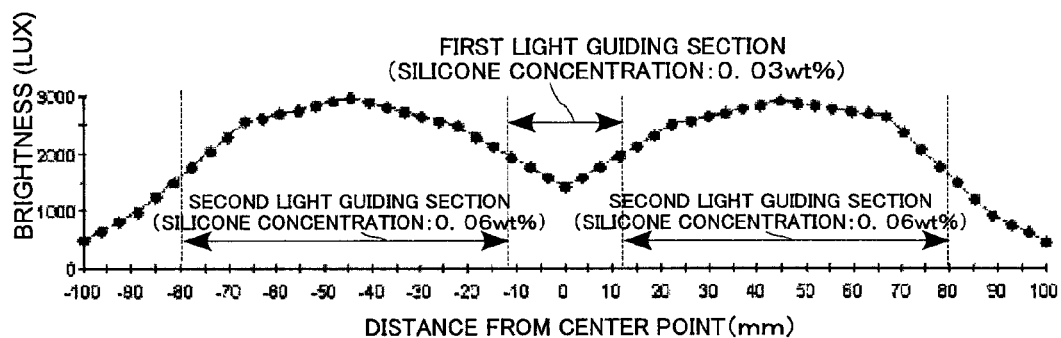
FIG. 11 shows a brightness distribution in a light emitting device of a second modification with respect to the light emitting device according to the embodiment of the present invention.

FIG. 11 shows a brightness distribution in the light emitting device 40 (the light emitting device 40 of a second modification) in which the first light guiding section 2 contains 0.03 wt. % concentration of the light scattering particles 21, namely the concentration is a half of the content rate (0.06 wt. %) of the light scattering particles 21 in the second light guiding section 3. It is understood that the second light guiding section 3 is a little bit brighter than the first light guiding section 2. It is because the quantity of light passing through the light scattering particles 21 increases as a result of scattering by the light scattering particles 21 to increase the brightness of the first light guiding section 2, and consequently the quantity of light that enters the second light guiding section 3 decreases.

Figure 12:
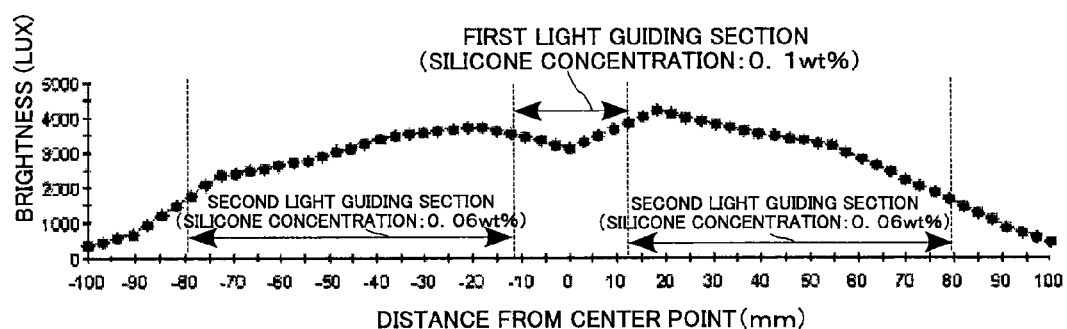
FIG. 12 shows a brightness distribution in the light emitting device according to the embodiment of the present invention.

FIG. 12 shows a brightness distribution in the light emitting device 40 in which the first light guiding section 2 contains 0.1 wt. % concentration of the light scattering particles 21, namely the concentration is a slightly higher than the content rate (0.06 wt. %) of the light scattering particles 21 in the second light guiding section 3. The brightness distribution shown is that of the light emitting device 40 according to the embodiment of the present invention. It is understood that the first light guiding section 2 and the second light guiding section 3 have roughly equalized brightness. It is because the quantity of light passing through the reflecting surface 12 further increases as a result of the light scattering particles 21 increased more in the first light guiding section 2, and meanwhile the quantity of light that enters the second light guiding section 3 decreases further.

Figure 13:
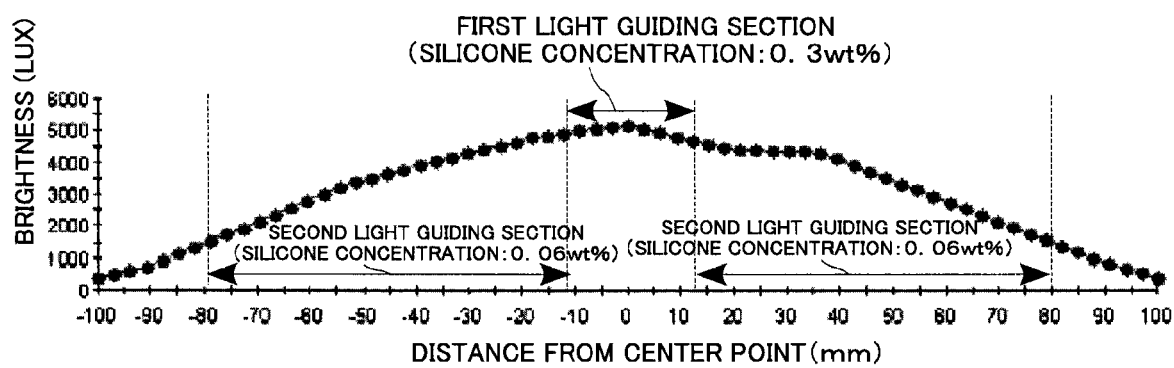
FIG. 13 shows a brightness distribution in a light emitting device of a third modification with respect to the light emitting device according to the embodiment of the present invention.

FIG. 13 shows a brightness distribution in the light emitting device 40 (the light emitting device 40 of a third modification) in which the first light guiding section 2 contains 0.3 wt. % concentration of the light scattering particles 21, namely the concentration is 5 times higher than the content rate (0.06 wt. %) of the light scattering particles 21 in the second light guiding section 3. It is understood that the first light guiding section 2 is brighter than the second light guiding section 3.

Figure 14:
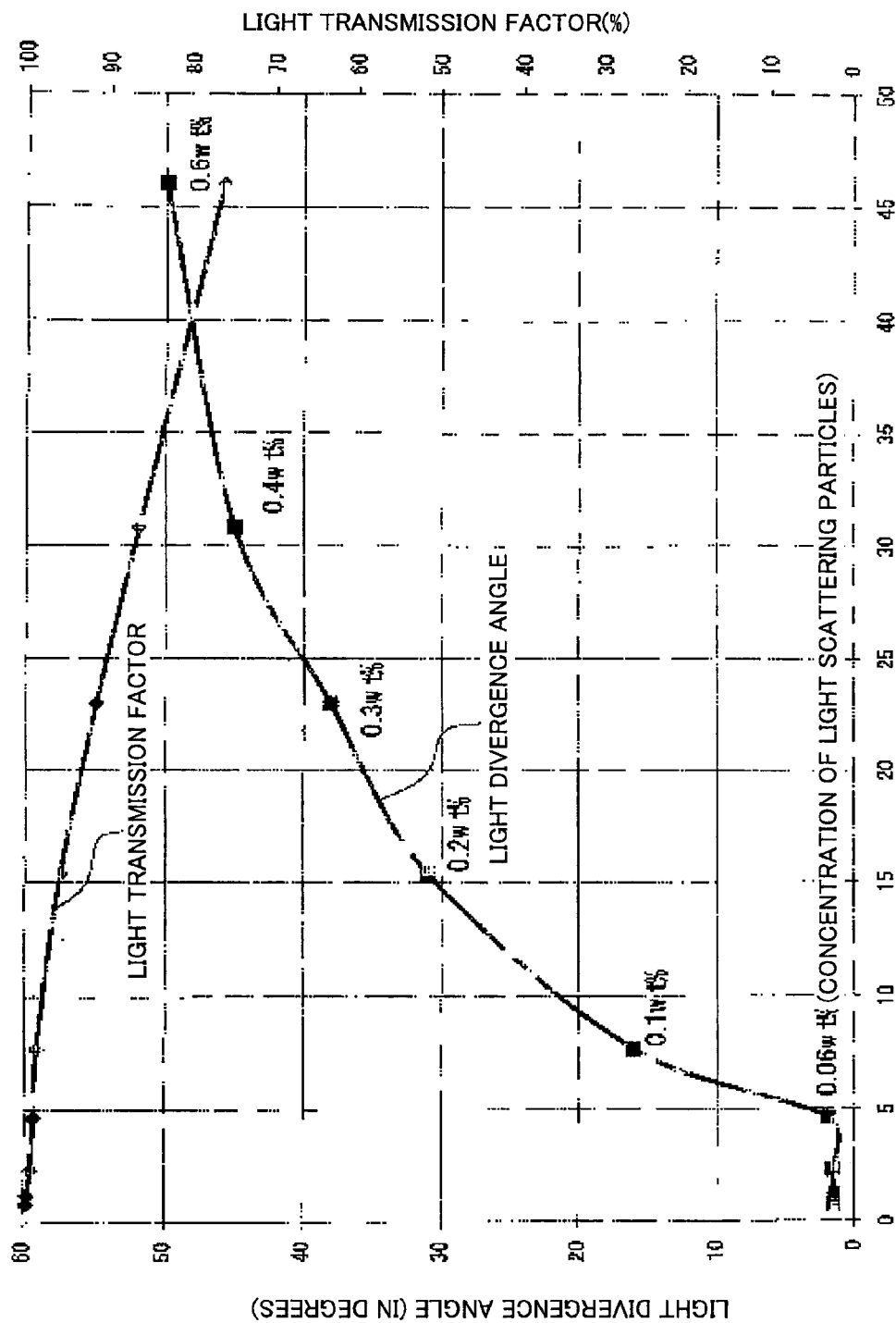
FIG. 14 is a graph showing a relationship between a light divergence angle and a light transmission factor as a density of light scattering particles varies; wherein the light scattering particles, used for the light emitting device according to the embodiment of the present invention, being contained in an acrylic resin plate with a thickness of 10 mm.

FIG. 14 shows a relationship between a light divergence angle and a light transmission factor as a density of the light scattering particles 21 varies; wherein a PMMA plate with a thickness of 10 mm contains the light scattering particles 21 with a particle diameter of 7.3 μm. In this situation, the light divergence angle is an angle spread in a 360-degree indication at which scattered and spread light has a half of the brightness at the center. As shown in FIG. 14, when the content rate of the light scattering particles 21 is 0.06 wt. %, almost no divergence happens and the light transmission factor is around 98%. By making use of FIG. 14, the brightness of the translucent member 1 and the launching direction of light ray can be set in various ways.

Where a scattering parameter is expressed as "τ" ("1/τ" is a mean free path, to be expressed in "cm"), and a thickness of the first light guiding section 2 is expressed as "T" (expressed in "cm"), the product of "τ" and "T" with respect to the light scattering particles 21 is within a range of 0.1 to 50. If the product of "τ" and "T" is 0.1 or less, the mean free path of light rays becomes long and the amount of light rays scattered within a distance of the thickness "T" becomes less so that an adequate amount of light rays cannot be emitted externally from the reflecting surface 12 of the first light guiding section 2. Meanwhile, if the product of "τ" and "T" is 50 or greater, the mean free path of light rays becomes short and the amount of light rays multiply-scattered within the distance of the thickness "T" becomes great so that the backscatter becomes great and a frontward light transmission factor decreases, as shown in FIG. 14. In other words, the light efficiency of light rays, which enter the light incoming section 11 and travel along the dotted lines with an arrow shown in FIG. 9 from the first light guiding section 2 toward the second light guiding section 3, becomes less.

In the prism section 22, the protrusion angle θ of a saw tooth 23 positioned closer to the center point 13 is smaller than that of a saw tooth 23 positioned further from the center point 13. Therefore, at a position further from the center point 13, light can be radiated in a direction for traveling further away from the LED 30 so that light can be radiated in a wide-angle spread. As a result, the light emitting device 40 becomes appropriate for an application of lighting equipment that can illuminate a wide extent. Furthermore, owing to radiation in a wide-angle spread, the light emitting device 40 can be made to be thin. Moreover, when the light emitting device 40 is modularized so as to be placed in a multiple arrangement, the number of modules can be reduced because of radiation in a wide-angle spread, and consequently it can lead to cost reduction.

As shown in FIGS. 10, 11, 12, and 13, even a position being distant from the translucent member 1 is illuminated, and therefore it is obvious that the light emitting device 40 can radiate in a wide-angle spread.

Since the protrusion angle θ can be modified arbitrarily, the way of illumination can be changed in accordance with an application of the light emitting device 40. The way of illumination can be made for radiating in a wide-angle spread, as described above, and contrarily it is also possible to radiate in a narrow-angle spread as a downlight does. In the case where the crossing angle β formed by the line "L" connecting protrusion peaks of the saw teeth 23 in a radial direction and the topside surface of the second light guiding section 3 is within a range of 2 to 10 degrees, preferably the protrusion angle θ should be set in a range of 45 to 75 degrees.

Furthermore, at the lower side of the edge 15, in the second light guiding section 3, being distant from the LED 30, there is formed the reflecting part 16 for reflecting guided light toward the topside. Therefore, even if there remain any light, which the prism section 22 alone cannot change traveling directions of, it is still possible to change the traveling direction of such light toward the topside.

(Other Modifications)

Besides the above explanation with regard to the translucent member 1 and the light emitting device 40 according to the embodiment of the present invention, various other modifications may be made without changing the concept of the present invention.

The optical element (the translucent member 1) according to the embodiment of the present invention includes: the light incoming section 11 through which light enters; the first light guiding section 2 for guiding the light incident on the light incoming section 11; the reflecting surface 12, placed to be opposite to a light beam entry side of the first light guiding section 2, for totally-reflecting a linearly-traveling part of the incident light; and the second light guiding section 3 for guiding the reflected light; wherein the first light guiding section 2 contains the light scattering particles 21 for multiply-scattering light and generating light which passes through the reflecting surface 12 and is emitted externally; and the second light guiding section 3 launches at least a part of the incident light in a direction of the same surface side as the light passing through the reflecting surface 12 travel out. Alternatively, the second light guiding section 3 may also contain the light scattering particles 21. Furthermore, the light incoming section 11 includes the bottom side of the first light guiding section 2 and the LED holder 17, and the bottom side of the first light guiding section 2 may include an entire section or a part of the bottom side. Moreover, the light, which the second light guiding section 3 launches, goes out in the direction of the same surface side as the light beams passing through the reflecting surface 12 travel out; and in this situation, a part of the light or the entire light may be launched from the bottom side of the second light guiding section 3, or launched to an outer circumference side of the edge 15.

The optical element (the translucent member 1) according to the embodiment of the present invention has the prism section 22 at a position, opposite to a side of the reflecting surface 12, in the second light guiding section 3, the prism section 22 having its sawtooth-like section for changing traveling directions of the guided light in the direction of the same side as the reflecting surface 12. Alternatively, the prism section 22 may be omitted since it is not an essential element. Furthermore, the prism section 22 may be placed at an upper side of the second light guiding section 3. Alternatively moreover, not having its sawtooth-like section, the prism section 22 may be formed as a straight line as the line "L" is, or as a curved line. Still further, though the saw teeth 23 include 6 divided groups, the grouping is not necessary. For example, the greater gradually the protrusion angle θ of each saw tooth 23 may be made while every saw tooth having a different protrusion angle θ, the further from the center point 13 toward the edge 15 the saw tooth 23 is located.

Preferably, the optical element (the translucent member 1) according to the embodiment of the present invention should include the reflecting part 16 for reflecting the guided light toward the same side as the reflecting surface 12, at the edge 15 positioned within the second light guiding section 3, being distant from the first light guiding section 2. Alternatively, the reflecting part 16 may be omitted since it is not an essential element. Furthermore alternatively, the prism section 22 may be extended up to the edge 15.

The optical element (the translucent member 1) according to the embodiment of the present invention contains the light scattering particles 21 in the second light guiding section 3, and the content rate of the light scattering particles 21 in the first light guiding section 2 is higher than that in the second light guiding section 3. Alternatively, the content rate of the light scattering particles 21 in the first light guiding section 2 may be lower than that in the second light guiding section 3, or the content rate in both the sections may be the same. Furthermore, the second light guiding section 3 may not contain the light scattering particles 21.

With regard to the light scattering particles 21 in the optical element (the translucent member 1) according to the embodiment of the present invention; wherein a scattering parameter and a thickness of the first light guiding section 2 are expressed as "τ" and "T", respectively, the product of "τ" and "T" with respect to the light scattering particles 21 is within a range of 0.1 to 50. Alternatively, the product of "τ" and "T" may be outside the range, being such as 0.01, 0.05, 60, 70, 80 and the like.

The light emitting device 40 according to the embodiment of the present invention includes: the translucent member 1 and the light emitting component (the LED 30); the translucent member 1 having: the light incoming section 11 through which light enters; the first light guiding section 2 for guiding the incident light on the light incoming section 11; the reflecting surface 12, placed to be opposite to a light beam entry side of the first light guiding section 2, for totally-reflecting a linearly-traveling part of the incident light; and the second light guiding section 3 for guiding the reflected light; and the light emitting component (the LED 30) emitting light into the light incoming section 11; wherein the first light guiding section 2 contains the light scattering particles 21 for multiply-scattering light and generating light which passes through the reflecting surface 12 and is emitted externally; and the second light guiding section 3 launches at least a part of the incident light in a direction of the same surface side as the light passing through the reflecting surface 12 travel out. Alternatively, the second light guiding section 3 may also contain the light scattering particles 21. Furthermore, as the light emitting component, one of a light guiding member for guiding light from a light source and a light reflecting member for reflecting light from a light source may be used instead of a light source for emitting light directly into the light incoming section 11.

In the light emitting device 40 according to the embodiment of the present invention, the second light guiding section 3 is formed to be plate-like; and placed at a center of the plate-like second light guiding section 3 is the first light guiding section 2 that is circular in its plane. Alternatively, the second light guiding section 3 may have its contour of a polygonal shape, such as a triangular contour, a quadrilateral contour, etc.; and furthermore it may also have an oval-figured contour as well. By the same token, the first light guiding section 2 may also have its contour in its plane, such as any polygonal contour, an oval-figured contour, and the like.

In the light emitting device 40 according to the embodiment of the present invention, the translucent member 1 is made of a translucent resin material, and the light scattering particles 21 are translucent silicon particles having their particle diameter within a range from 1 to 10 μm; wherein the light scattering particles 21 are also included in the second light guiding section. Alternatively, any other kinds of light scattering particles may be used as the light scattering particles 21, regardless of their material, shape, particle diameter, and the like, as long as they multiple-scatter light in the translucent member 1. In this regard, the light scattering particles 21 should preferably be translucent silicon particles with their diameter in a range from 1 to 10 μm, from the viewpoint that, while traveling along the optical paths shown in FIG. 9 (the dotted lines with an arrow), the light should suitably be scattered in other directions. To describe more in detail, using silicon particles with their diameter of 1 μm or greater makes it possible to suppress the spread of the angular distribution, and lessen an element of the backscatter. Then, it becomes possible to prevent the frontward light intensity from being lessened, and to prevent the quantity of light guided into the second light guiding section 3 from decreasing excessively, so that it becomes easy to restrain the quantity of light passing through the reflecting surface 12 of the first light guiding section 2 from becoming excessively great. In the meantime, using silicon particles with their diameter of 10 μm or smaller makes it possible to refrain the angular distribution from becoming excessively narrow, so that it becomes possible to obtain the enough quantity of light passing through the reflecting surface 12 of the first light guiding section 2.

Used as the translucent member 1 is a component made of PMMA. Alternatively, for the member, it is also possible to use any other translucent resin material such as acrylic resin material, polystyrene, polycarbonate, and the like that are other kinds of polymer materials of acrylic acid ester, or methacrylate ester, and are amorphous synthetic resin materials having high transparency, as well as glass material and so on. Though the first light guiding section 2 and the second light guiding section 3 are assembled together through integrating later into a whole, alternatively the translucent member 1 may be obtained by forming a wholly-integrated single component including the first light guiding section 2 and the second light guiding section 3 from the very beginning.

Though the light incoming section 11 is a part of the first light guiding section 2, and flat-surfaced; alternatively the light incoming section 11 may be formed to be convex, curved, aspheric, etc. When the light incoming section 11 is formed to be spherical or aspheric, the curvature may be modified arbitrarily. Furthermore, the light incoming section 11 may be also prepared separately from the first light guiding section 2.

The light emitting component is not limited to the LED 30, and alternatively other light emitting elements such as organic electro-luminescence (OEL), inorganic electro-luminescence (IEL), laser luminescence, and the like may be used. Furthermore, a chip-shaped component is used as the LED 30, and alternatively an LED component equipped with a lens may be used.

Having its circular contour, the translucent member 1 includes; the reflecting surface 12 which is circular- and concave-shaped, and located at the center of the translucent member 1; and the second light guiding section 3 for guiding light, which is circular-shaped, and located around the reflecting surface 12. Alternatively, the contour of the translucent member 1, the shape of the reflecting surface 12 in its plane, the shape of the second light guiding section 3, and the like may be modified. For example, when the second light guiding section 3 has its quadrilateral contour as described above, the translucent member 1 can also have its quadrilateral contour. Thus, an advantage of the translucent member 1 having its quadrilateral contour is that the translucent member 1 enables placement of light-emitting faces of a plurality of light emitting devices 40 with no gap among them. In the case of placement of the light-emitting faces in this way for their use, it becomes easy for the light-emitting faces to emit light uniformly.

The reflecting surface 12 of the translucent member 1 has a curved surface in such a way that a differentiation result of a function corresponding to its profile curve is given as a formula of "$\tan(90-\theta t/2)$", as shown in FIG. 9. Alternatively, the profile curve may be structured with another curve according to any other conditions as far as the curve enables totally-reflection of light from the LED 30 deemed as a point light source. Furthermore, being different from a structure with a profile curve such as an aspheric surface curve, the reflecting surface 12 may have another kind of section with an angular shape, namely a series of straight lines connected. Namely in this case, light reflected by the angular-shaped section may not need to form light paths being almost parallel in the second light guiding section 3.

The second light guiding section 3 of the translucent member 1 includes the prism section 22 composed of 225 saw teeth 23 which are placed on concentric circles centered at the center point 13, and formed on the bottom surface in FIG. 7. Then, in the saw teeth 23, a protrusion angle $\theta$ of a position closer to the center point 13 is smaller than that of a position further from the center point 13. Alternatively, a location and a shape of the prism section 22, the number of saw teeth, and a protrusion angle $\theta$ of each saw tooth may be modified. For example, while the saw teeth 23 being placed on concentric circles centered at the position of the LED 30, the translucent member 1 may have a quadrilateral contour through cutting out the edge 15 of the second light guiding section 3.

Though the prism section 22 is formed through placement of the saw teeth 23 on the concentric circles centered at the center point 13, alternatively the saw teeth 23 may be placed on a straight line. For example, when a contour of the translucent member 1 is quadrilateral, the saw teeth 23 may be formed along straight lines of the quadrilateral contour. Furthermore, the reflecting part 16 is placed for totally-reflecting the guided light, and the part may be prepared through printing treatment by using white ink, or may be so made as to have a mirror-like surface through mirror-coating, etc., by using aluminum, silver, and the like. It is preferable that the reflecting part 16 is so structured as to totally-reflect the guided light since structuring in this way eliminates any further preparation, such as printing treatment and so on in the manufacturing step.

Though, in the present embodiment, the distance "H" between neighboring two saw teeth 23 is 0.2 mm, alternatively the distance "H" may be modified so as to be set with, e.g., 0.1 mm, 0.3 mm, and so on. Furthermore, it is also possible to set the distance "H" with varying distance values. Namely, there may exist some different distance values in the translucent member 1.

The saw teeth 23 are placed on the concentric circles, and one end of the prism section 22 is a part of the prism section 22 at a side closer to the center of the concentric circles, while another end of the prism section 22 is a part of the prism section 22 at a side further from the concentric circles. Alternatively, a location and a shape of the prism section 22 may be changed. For example, the prism section 22 may be formed to have polygonal shapes, such as quadrilateral forms and the like, as saw teeth 23*a* of a translucent member 1*a* of a first modification of the translucent member 1 shown in FIG. 15, being different from concentric circles; the quadrilateral forms having one center common to them.

Figure 15:
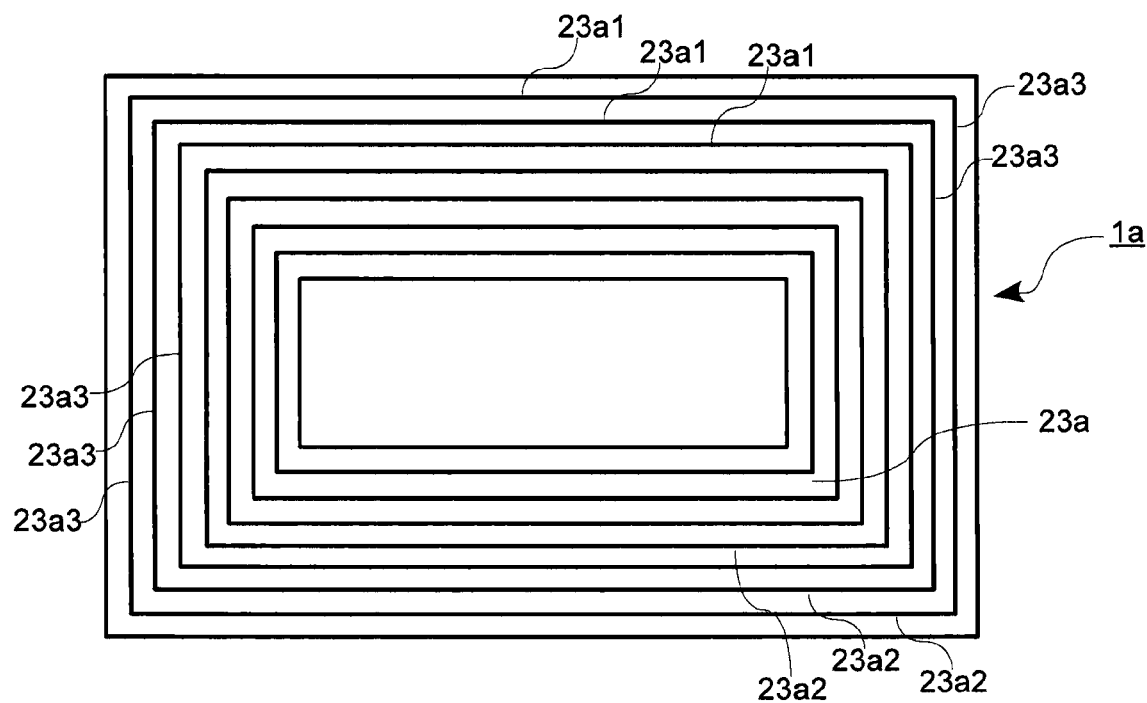
FIG. 15 is a plan view drawing to show a first modification of the translucent member according to the embodiment of the present invention.
Figure 16:
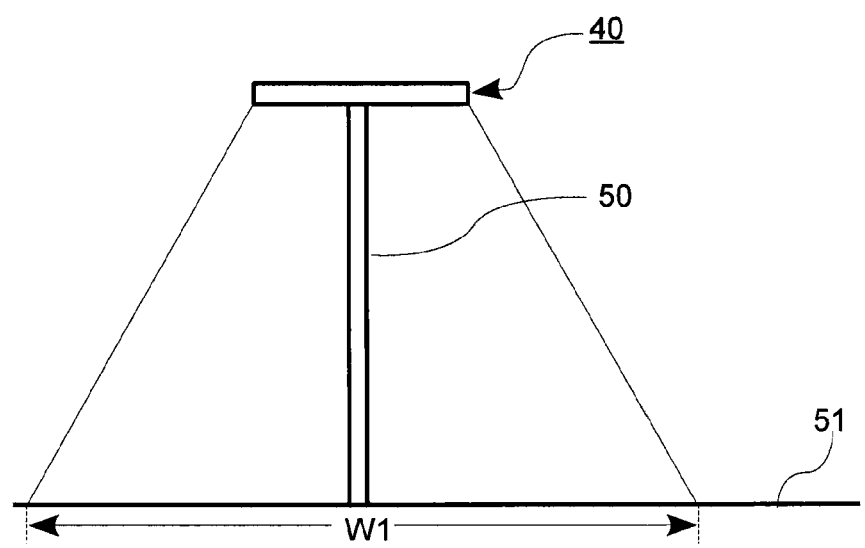
FIG. 16 is a drawing to show an example of using a light emitting device applying the translucent member shown in FIG. 15 as a street lamp, the drawing showing a view from a road side.
Figure 17:
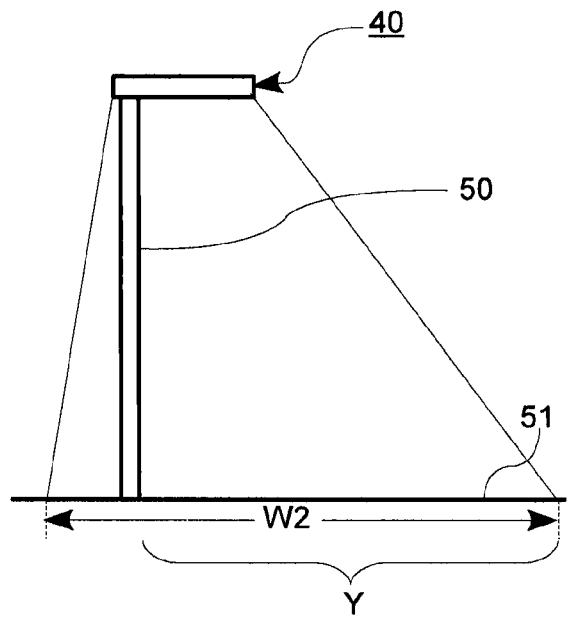
FIG. 17 is a drawing to show the example of using the light emitting device applying the translucent member shown in FIG. 15 as the street lamp, the drawing showing a view in a traveling direction.

FIGS. 16 and 17 are drawings to show an example of using a light emitting device 40 applying the translucent member 1*a* shown in FIG. 15, as a street lamp. One end of a support post 50 is connected to a light emitting side of the light emitting device 40, meanwhile the other end of the support post 50 is buried into the ground, and the light emitting device 40 illuminates an area W1 to be illuminated on the ground from an elevated position. In the area W1 to be illuminated, light from the light emitting device 40 is spread radially and uniformly along a road 51.

An area W2 to be illuminated by the light emitting device 40 in a widthwise direction of the road 51 extends radially in such a way as to cover an entire area of a width Y of the road 51. The way of extending is to cover a wide area at a side of the road 51 and a narrow area at an outside of the road 51, as shown in FIG. 17. This way of illumination is achieved by changing protrusion angles $\theta$ of the saw teeth 23*a* placed in the translucent member 1*a* shown in FIG. 15 according to their positions. In other words, a protrusion angle $\theta$ of saw teeth 23*a*1 positioned at an upper side in FIG. 15 is set to be smaller than that of saw teeth 23*a*2 positioned at a lower side. When protrusion angles are set in this way, an area to be illuminated can be controlled arbitrarily, such as making an area to be illuminated wider at the side of the road, for example, in the case of installing a street lamp applying the light emitting device 40 at a boundary between a road and a forest.

Sometimes it may be preferable that the support post 50 is so connected as to cover a section corresponding to the first light guiding section 2 in the light emitting side of the light emitting device 40. For example, when the light emitting device 40 has a relatively non-uniform brightness distribution as shown in FIG. 10 and FIG. 11, a relatively dark area corresponding to the first light guiding section 2 is covered by the support post 50 so as to enable uniforming the illuminating condition. Furthermore, as a translucent member for illuminating a right-side area and a left-side area equally in a certain direction while illuminating a right-side area and a left-side area unequally in a direction perpendicular to the above-mentioned direction as shown in FIG. 16 and FIG. 17, even the translucent member 1 with a circular form as shown in FIG. 1 may be applied, being different from the translucent member 1a with a quadrilateral form as shown in FIG. 15.

Figure 18:
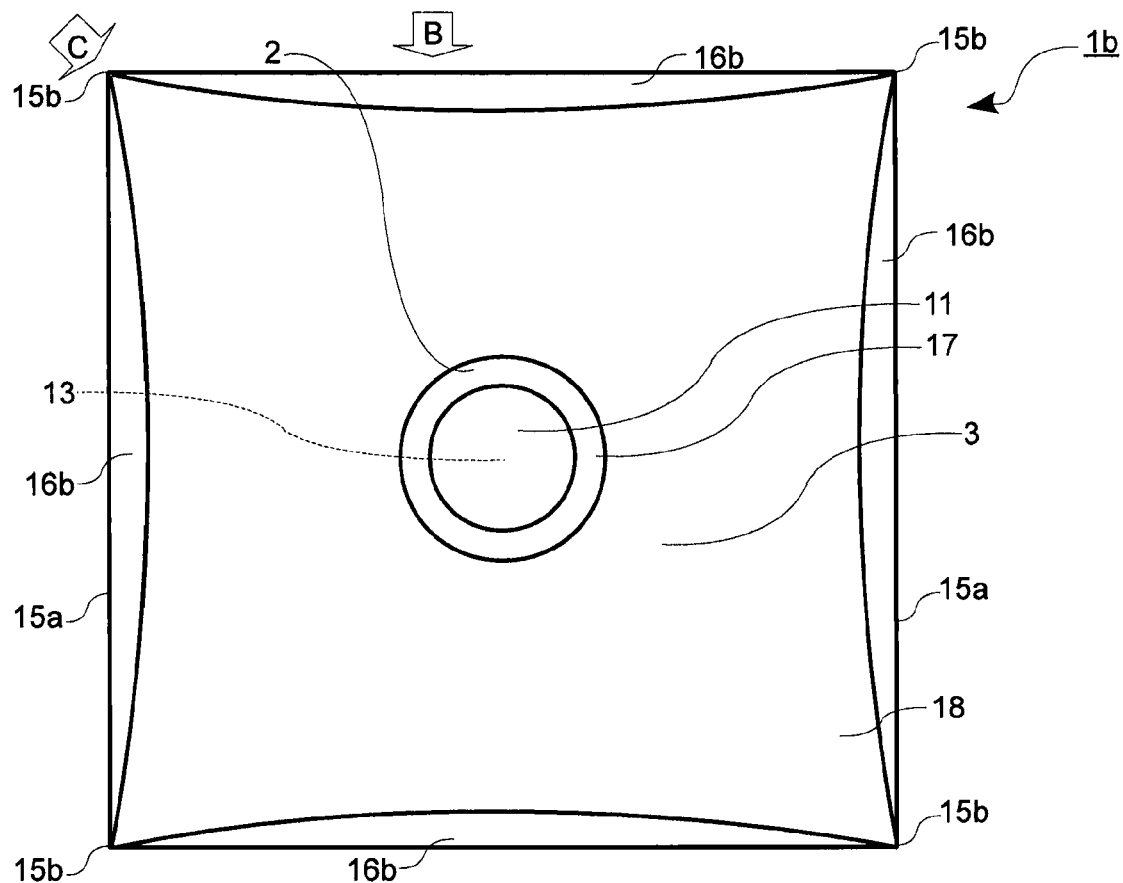
FIG. 18 is a plan view drawing to show a second modification of the translucent member according to the embodiment of the present invention.

Shown in FIG. 18 as a second modification of the translucent member 1 is a bottom plan view of a translucent member 1b prepared by placing the saw teeth 23 positioned on concentric circles centered at a location of the LED 30, and cutting out the edge 15 of the second light guiding section 3, in order to make a contour of the translucent member 1 quadrilateral (square). Each component having the same shape and the same function as its corresponding one existing in the translucent member 1 is provided with the same reference numeral that the corresponding one has in FIG. 3, and an explanation on the component is omitted. A square contour section of the translucent member 1b has an edge 15a constituting each side part and an edge 15b constituting each corner point. Each reflecting part 16b corresponding to the reflecting part 16 of the translucent member 1 includes 4 oval-lined part, each of which is formed by swelling toward the center point 13 in a direction connecting neighboring reflecting parts 16 along each edge 15a.

Figure 19:
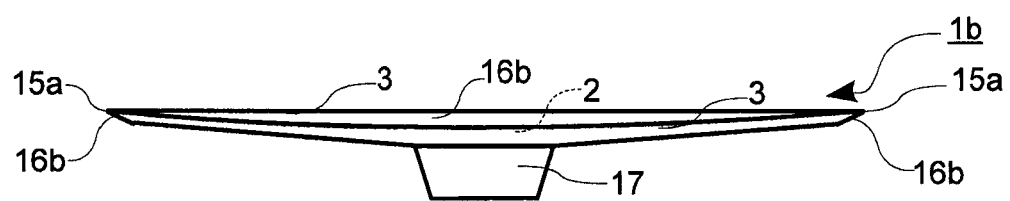
FIG. 19 is a side elevation view of the translucent member of the second modification shown in FIG. 18, the side elevation view showing a view taken from a direction of a large arrow "C" in FIG. 18.
Figure 20:
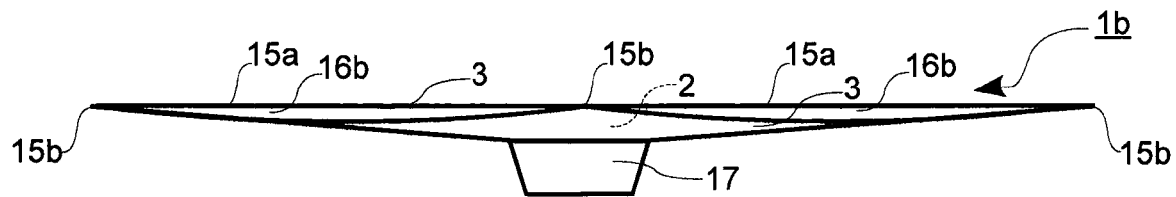
FIG. 20 is a side elevation view of the translucent member of the second modification shown in FIG. 18, the side elevation view showing a view taken from a direction of a large arrow "B" in FIG. 18.

FIG. 19 is a side elevation view of the translucent member 1b shown in FIG. 18, taken from a direction of a large arrow "B" in the drawing. FIG. 20 is a side elevation view of the translucent member 1b shown in FIG. 18, taken from a direction of a large arrow "C" in the drawing. Also with respect to FIG. 19 and FIG. 20, each component having the same shape and the same function as its corresponding one existing in the translucent member 1 is provided with the same reference numeral that the corresponding one has in FIG. 3, and an explanation on the component is omitted. An angle formed by a surface of the reflecting part 16b and the top surface of the second light guiding section 3 is 30 degrees, as the angle θ is. As shown in FIG. 20, no reflecting part 16b exists at a position of edge 15b.

Figure 21:
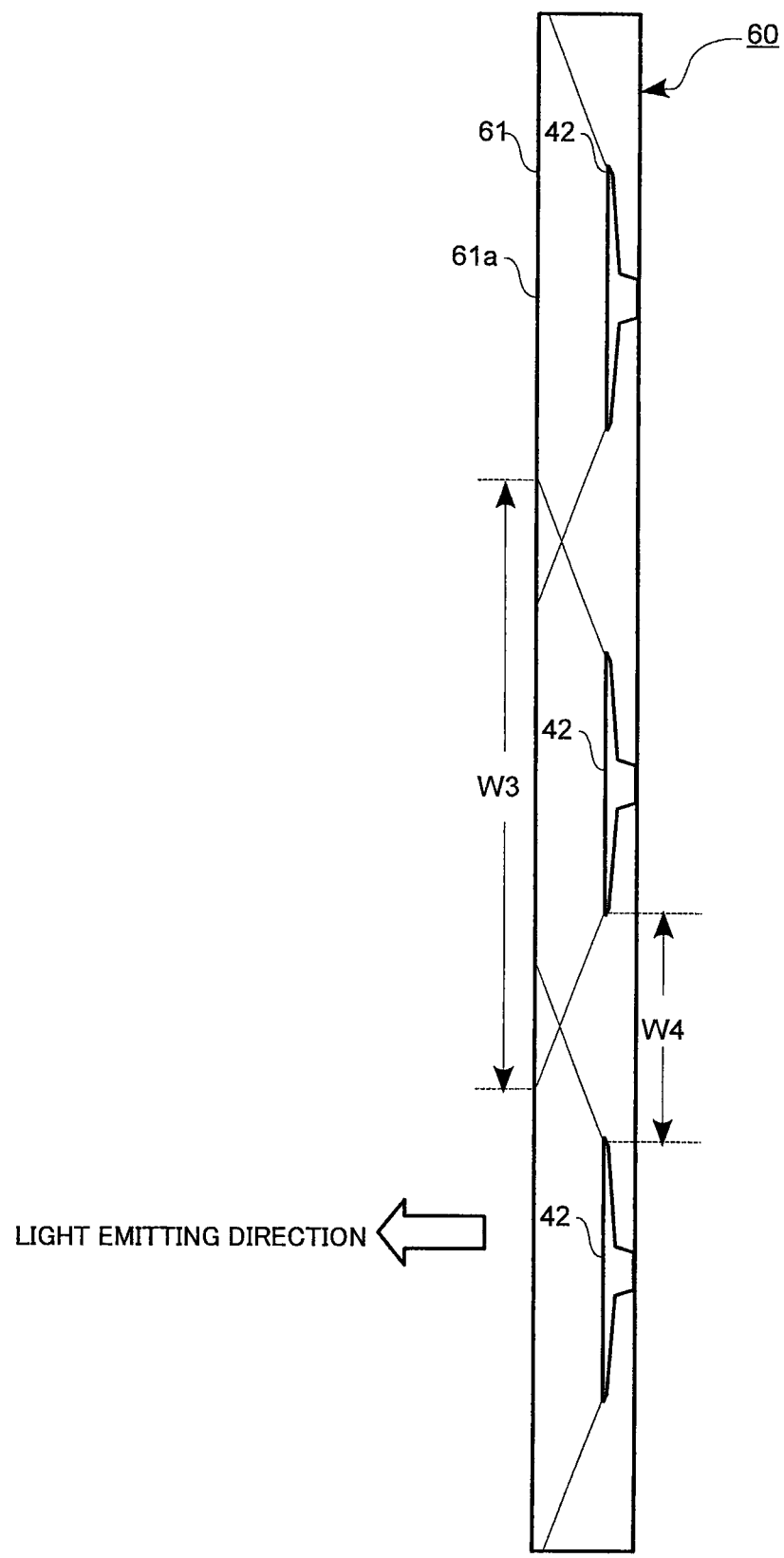
FIG. 21 is a schematic cross-sectional view of a sign applying a light emitting device using the translucent member of the second modification, as a light source.

FIG. 21 is a schematic cross-sectional view of a sign 60 including 3 light emitting devices 42, each of which is a second modification of the light emitting device 40 using the translucent member 1b, as light sources. On a front surface 61b of the sign 60, there are illustrated some characters and images, or there is placed a poster and the like. Each of the light emitting devices 42 can illuminate a wide area, and practically illuminates an area W3. In other words, as shown in FIG. 21, the light emitting devices 42 illuminate in such a way that an area to be illuminated by one of the light emitting devices 42 overlaps a part of that (an edge part) of a neighboring one of the light emitting devices 42. Therefore, the sign 60 is observed as if an entire area of the sign 60 emits light in its illuminating direction. This illumination status can be achieved even when each of the light emitting devices 42 is placed, while having a clearance W4 from its neighboring light emitting device, in the sign 60. Accordingly, in the case of the sign 60, the number of light sources can be reduced dramatically, being compared with another case where conventionally a number of LEDs are placed and used as light sources for a sign. As a result, the sign 60 exerts its effects of reduction in power consumption, reduction in the number of constituent components, and so on.

FIG. 21 shows a case where 3 light emitting devices 42 are placed in a vertical direction. Alternatively, 3 lines of light emitting devices in both vertical and horizontal directions so as to have 9 light emitting devices 42 in total may be placed for making up a sign 60 having a square surface 61, and furthermore 3 lines by 5 lines of 15 light emitting devices 42 in total may be placed for making up another rectangular sign 60. Any number of devices in vertical and horizontal directions may be adopted arbitrarily.

What is claimed is:

1. An optical element comprising: a flat and circular-shaped first light guiding section and a second guide section positioned around the first light guiding section; in which:
   the first light guiding section includes a light incoming section through which light enters and a reflecting surface that is located at a surface opposite to the light incoming section and reflects the incident light from the light incoming section to the second light guiding section;
   wherein:
   the first light guiding section contains light scattering particles for multiply-scattering light and generating light which passes through the reflecting surface and is emitted externally; and
   the second light guiding section, which contains less light scattering particles than the first light guiding section contains, launches at least a part of the incident light in a direction of the same surface side as the light passing through the reflecting surface travel out.

2. The optical element according to claim 1:
   wherein the second light guiding section includes a prism section at a position, opposite to a side of the reflecting surface; the prism section having its sawtooth-like section for changing traveling directions of the guided light in the direction of the same side as the reflecting surface.

3. The optical element according to claim 1:
   wherein a reflecting part is formed at an edge of the second light guiding section, being distant from the first light guiding section; the reflecting part reflecting the guided light toward the same side as the reflecting surface.

4. The optical element according to claim 1:
   wherein, with regard to the light scattering particles, where a scattering parameter and a thickness of the first light guiding section are expressed as "τ" and "T", respectively, the product of "τ" and "T" with respect to the light scattering particles is within a range of 0.1 to 50.

5. A light emitting device comprising:
   a flat and circular-shaped translucent member and a light emitting component positioned around the first light guiding section;
   wherein the translucent member comprises a light incoming section through which light enters, and a reflecting surface that is located at a surface opposite to the light incoming section and reflects the incident light from the light incoming section to a second light guiding section;
   the light emitting component emits light into the light incoming section;
   wherein the first light guiding section contains light scattering particles for multiply-scattering light and generating light which passes through the reflecting surface and is emitted externally; and the second light guiding section which contains less light scattering particles than the first light guiding section contains, launches at least a part of the incident light in a direction of the same surface side as the light passing through the reflecting surface travel out.

6. The light emitting device according to claim 5:
   wherein the second light guiding section is formed to be plate-like; and the first light guiding section is placed at a center of the plate-like second light guiding section.

7. The light emitting device according to claim 5:
wherein the translucent member is made of a translucent resin material, and the light scattering particles are silicon particles having their particle diameter within a range from 1 to 10 μm; and
the light scattering particles are also included in the second light guiding section.

* * * * *